(12) United States Patent
Graham et al.

(10) Patent No.: US 6,302,144 B1
(45) Date of Patent: Oct. 16, 2001

(54) VEHICLE FUEL SYSTEM

(75) Inventors: Joseph M. Graham; Peter P. Kuperus; Ronald H. Roche, all of Cass City; Charles H Tuckey, Sand Point; Matthew L. Werner, Caro, all of MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/512,540

(22) Filed: Feb. 24, 2000

Related U.S. Application Data
(60) Provisional application No. 60/121,880, filed on Feb. 26, 1999.

(51) Int. Cl.[7] .................................................... B01D 49/00
(52) U.S. Cl. ............................... 137/565.17; 137/565.37; 137/576; 123/509; 123/514
(58) Field of Search .................... 137/565.17, 565.37, 137/576; 123/509, 514

(56) References Cited

U.S. PATENT DOCUMENTS

| | | |
|---|---|---|
| 4,919,103 | 4/1990 | Ishiguro et al. . |
| 5,146,901 | 9/1992 | Jones ..................................... 123/516 |
| 5,197,445 | 3/1993 | Casari ................................... 123/514 |
| 5,275,145 | 1/1994 | Tuckey ................................. 123/521 |
| 5,454,697 | * 10/1995 | Nakanishi .......................... 417/423.3 |
| 5,564,396 | * 10/1996 | Kleppner et al. ..................... 123/509 |
| 5,901,689 | 5/1999 | Kimura et al. . |
| 5,992,394 | * 11/1999 | Mukaidani et al. .................. 123/509 |
| 6,182,693 | * 2/2001 | Stack et al. ....................... 137/565.17 |

FOREIGN PATENT DOCUMENTS

| | | |
|---|---|---|
| 0624722 | 11/1994 | (EP) . |
| 10318051 | 12/1998 | (JP) . |

* cited by examiner

*Primary Examiner*—A. Michael Chambers
(74) *Attorney, Agent, or Firm*—Reising, Ethington, Barnes, Kisselle, Learman & McCulloch, P.C.

(57) ABSTRACT

A vehicle fuel system has an electronic control module received within a fuel tank to send data to and receive data from the electronic control unit (ECU) for the vehicle engine and other vehicle control systems, to provide an electronic control of the vehicle fuel system and to receive signals from one or more sensors mounted within the fuel tank which provide information about the operation of the fuel system. The fuel system integrates a plurality of components into the vehicle fuel tank to reduce the number of openings through the vehicle fuel tank and the number of external connections which must be made in assembly of the fuel system into a vehicle. By disposing a fuel vapor canister within the fuel tank, each vapor vent valve within the fuel tank can communicate completely within the tank with the vapor canister with a single outlet extending from the fuel tank to communicate fuel vapor from the canister with an intake manifold of the engine. Desirably, this outlet may extend through the same opening in the fuel tank through which the fuel pump, vapor canister, electronic control module and other components of the vehicle fuel system are inserted into the fuel tank. Notably, the number of openings in the tank is reduced and in one embodiment, only two openings are used in the tank, one for a fill pipe through which fuel is introduced into the tank and the other for the insertion of the various fuel system components into the tank.

23 Claims, 8 Drawing Sheets

VEHICLE FUEL SYSTEM

REFERENCE TO PROVISIONAL PATENT APPLICATION

This application claims the benefit of U.S. Provisional Patent Application Ser. No. 60/121,880, filed Feb. 26, 1999.

FIELD OF THE INVENTION

This invention relates to vehicle fuel systems.

BACKGROUND OF THE INVENTION

Typical automotive fuel systems have a fuel pump which may be mounted within or outside of a fuel tank, a fill pipe extending into the tank through which fuel is introduced into the tank, and one or more vapor vent valves or rollover valves which communicate with a vapor canister outside of the fuel tank. Each component is typically received through a separate opening in the fuel tank and is sealed thereto in assembly. Each opening through the fuel tank provides a leak path through which hazardous hydrocarbon vapors may escape to the atmosphere. Under increasingly strict governmental regulations, the emissions of hydrocarbons from vehicles must be reduced.

Additionally, in prior fuel systems, the operation of the fuel pump is controlled by the vehicle electronic control unit (ECU). The ECU also controls a plurality of other engine and vehicle functions and processes information provided from a plurality of sensors including sensors within the fuel tank such as a fuel level sensor. Notably, different fuel pumps, fuel tanks and other components may be used in different fuel system applications thereby requiring the ECU's to be programmed or calibrated for each particular application to properly function and control the various components. The various components for the vehicle fuel system also require a plurality of fluid connections and electrical connections between the interior of the tank and the exterior of the tank which undesirably increases the assembly time and cost of a vehicle fuel system.

SUMMARY OF THE INVENTION

A vehicle fuel system has an electronic control module received within a fuel tank to send data to and receive data from the electronic control unit (ECU) for the vehicle engine and other vehicle control systems, to provide an electronic control of the vehicle fuel system and to receive signals from one or more sensors mounted within the fuel tank which provide information about the operation of the fuel system. Further, the fuel system integrates a plurality of components into the vehicle fuel tank in addition to the electronic control module to reduce the number of openings through the vehicle fuel tank and the number of connections which must be made in assembly of the fuel system into a vehicle. For example, by disposing a fuel vapor canister within the fuel tank, each vapor vent valve within the fuel tank can communicate completely within the tank with the vapor canister with a single outlet extending from the fuel tank to communicate fuel vapor from the canister with an intake manifold of the engine. Desirably, this outlet may extend through the same opening in the fuel tank through which the fuel pump, vapor canister, electronic control module and other components of the vehicle fuel system are inserted into the fuel tank. Notably, the number of openings in the tank is reduced and in one embodiment, only two openings are used in the tank, one for a fill pipe through which fuel is introduced into the tank and the second for the insertion of the various fuel system components into the tank.

The electronic control module also greatly reduces the number of electrical connections between the interior and the exterior of the fuel tank by transmitting data to the ECU and other vehicle control systems and receiving data from the ECU and other vehicle control systems through a limited number of wires which may extend through a single electrical connector. In one embodiment, only four wires are needed between the interior and exterior of the fuel tank with two wires providing a power supply and ground, and the other two wires being a multiplex bus positive wire and a multiplex bus negative wire. Desirably, all of the information provided from the ECU and other vehicle control systems to operate the vehicle fuel system can be provided through these wires along with all of the information from the fuel system to the ECU. Further, the electronic control module may be calibrated or programmed for a particular fuel system to eliminate the need for the engine ECU to be programmed for particular fuel systems and to thereby enable a standard engine ECU to be used with a plurality of vehicle fuel systems and fuel tanks.

Thus, a plurality of components of the fuel system which were previously disposed outside of the fuel tank and a plurality of fuel system functions which previously occurred outside of the fuel tank have been incorporated within the fuel tank to reduce the complexity of the fuel system outside of the fuel tank and enable standardization of many components outside of the tank and to facilitate assembly of the fuel system into a vehicle.

Objects, features and advantages of this invention include providing a vehicle fuel system which reduces the number of openings in a vehicle fuel tank, reduces the escape to the atmosphere of hazardous hydrocarbon fuel vapors, has an electronic control module received within the fuel tank to provide signals of fuel system operation to an engine ECU and other vehicle control systems through a limited number of wires and to receive information from the ECU and other vehicle control systems to control the operation of the fuel system, eliminates the need for the vehicle ECU to be calibrated or programmed for any particular fuel system, enables a vehicle ECU to be used with a wide range of fuel systems, greatly facilitates assembly of the vehicle fuel system into a vehicle, can provide increased control of the vehicle fuel system by enabling the use of a plurality of sensors, significantly reduces the complexity of the vehicle fuel system outside of the fuel tank, substantially reduces the vehicle fuel system functions which occur outside of the fuel tank, is of relatively simple design and economical manufacture and assembly, is rugged, durable and has a long useful in service life.

BRIEF DESCRIPTION OF THE DRAWING

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
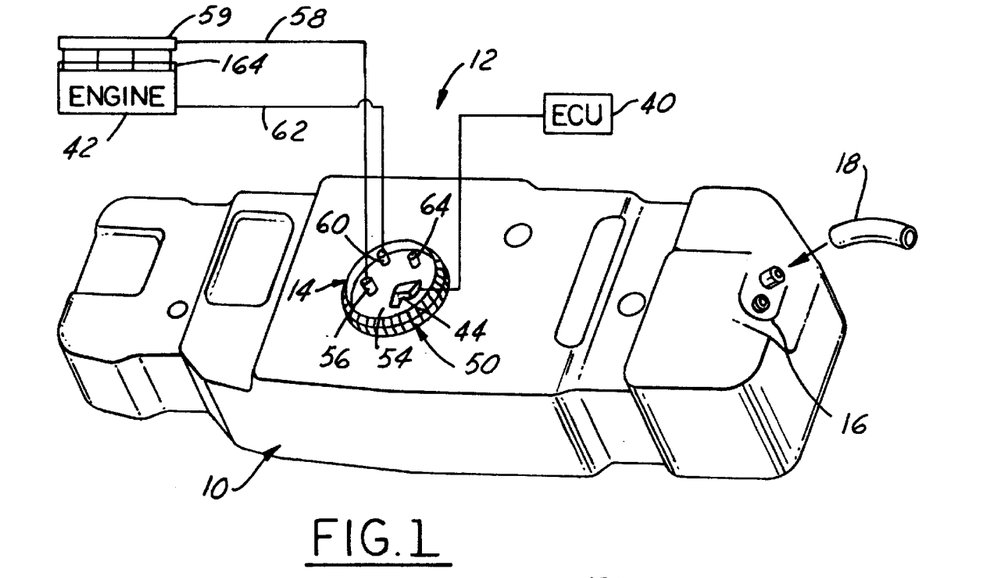
FIG. 1 is a perspective view of a vehicle fuel tank of a fuel system embodying the invention.
Figure 2:
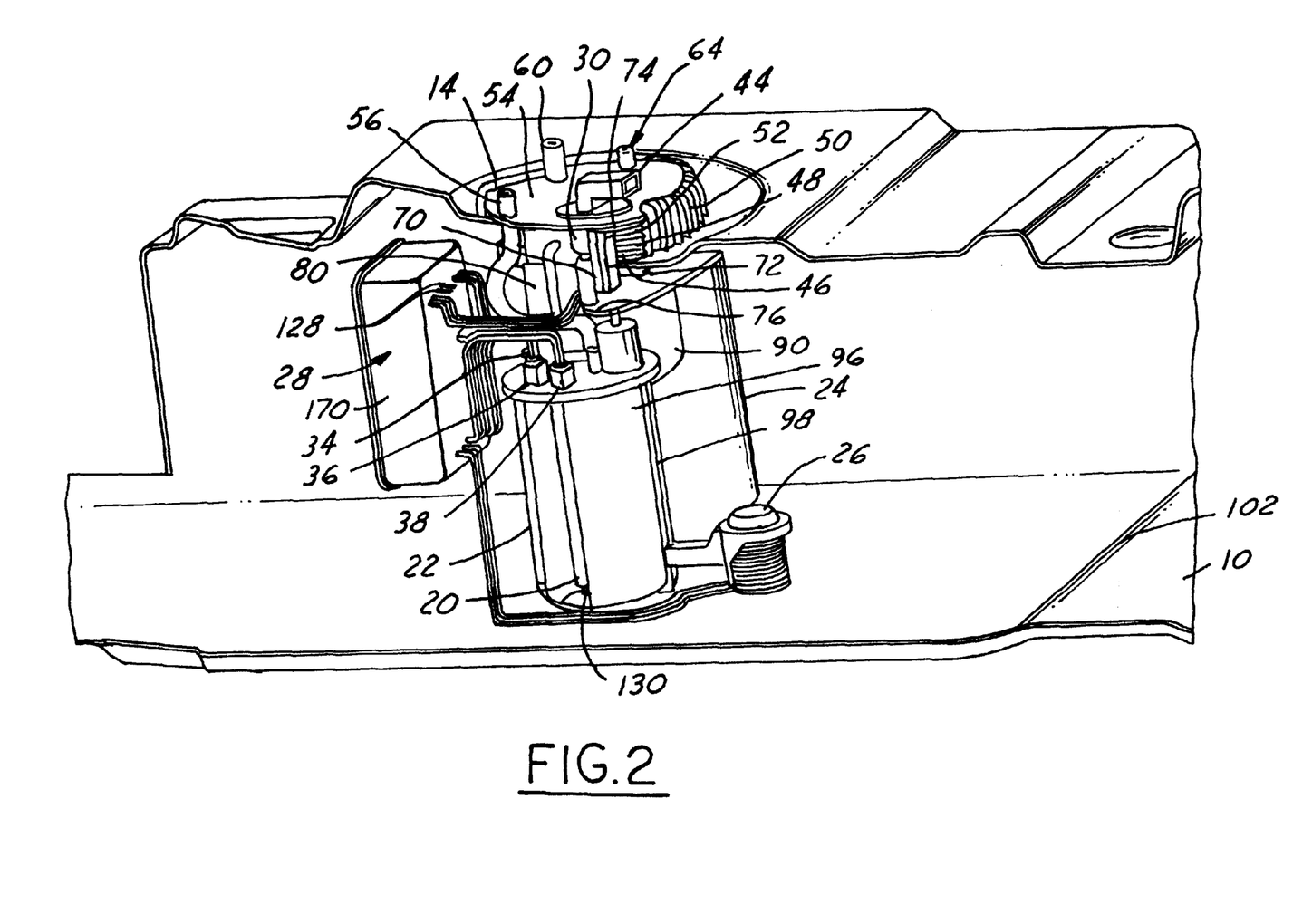
FIG. 2 is a sectional view of the fuel tank of FIG. 1 with parts broken away.
Figure 3:
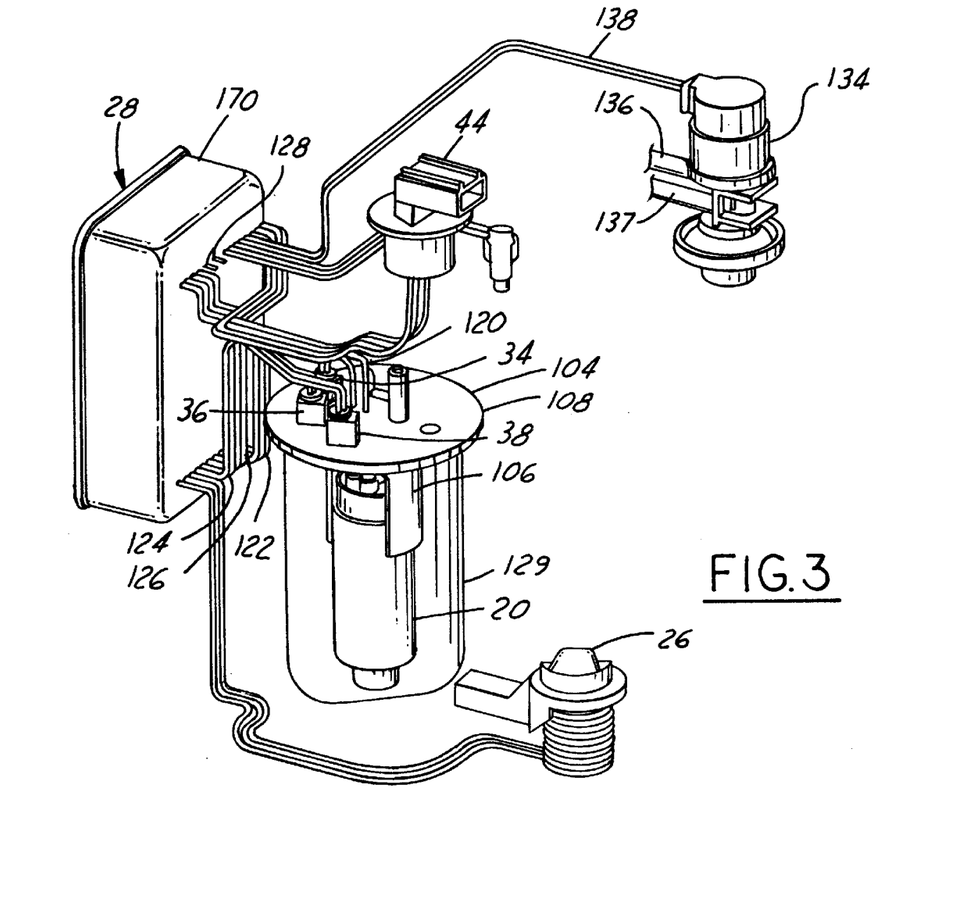
FIG. 3 is a perspective view of the various components of the fuel system including a tank control and sensor circuit.
Figures 4, 5:
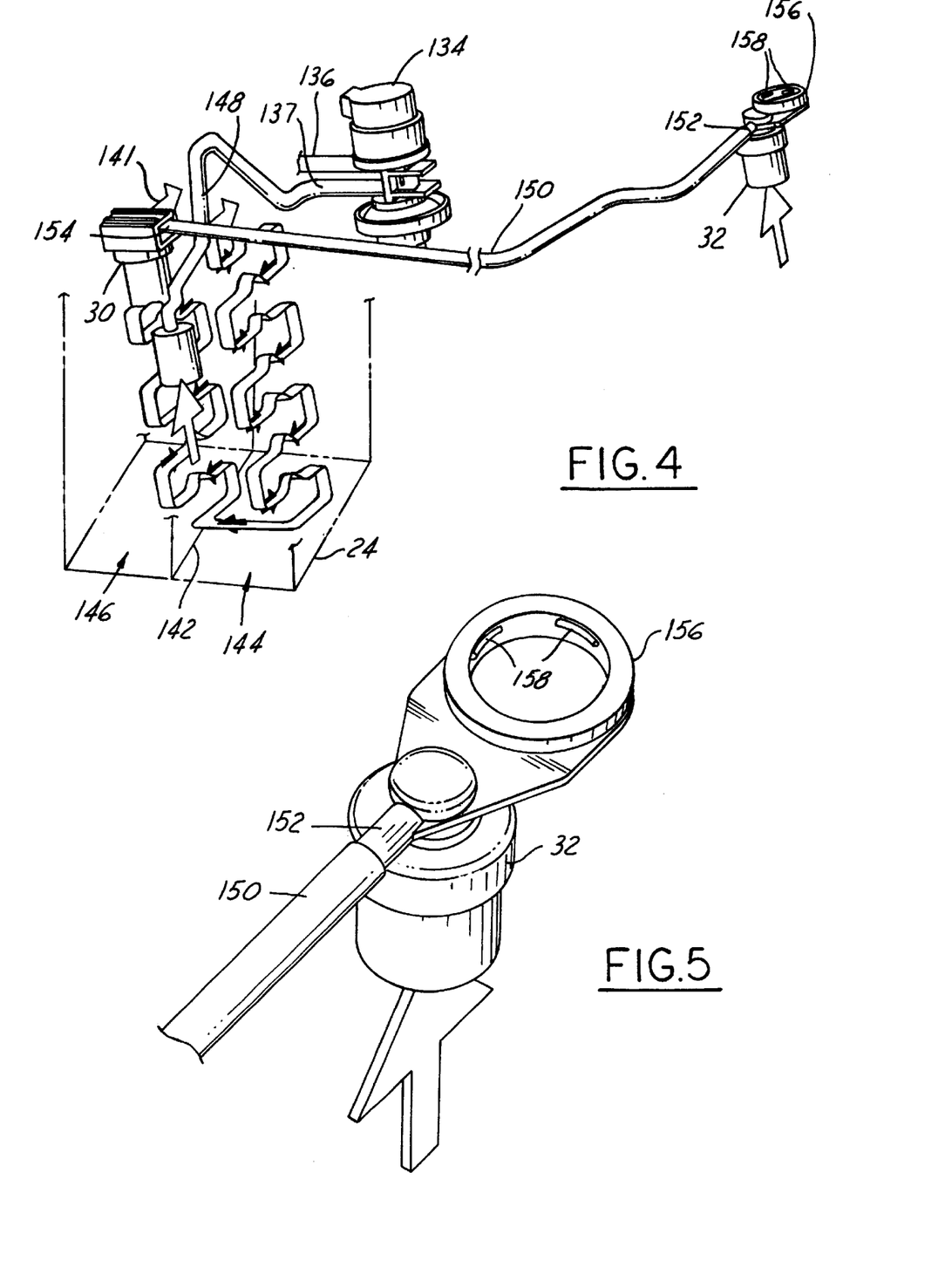
FIG. 4 is a diagrammatic perspective view of the various components of the fuel system including a vapor collection and purge circuit.
FIG. 5 is an enlarged perspective view of a vapor vent valve constructed to be disposed within the vehicle fuel tank.

Referring in more detail to the drawings, FIG. 1 illustrates a fuel tank 10 of a fuel system 12 embodying this invention having a first opening 14 through which a plurality of fuel system components are inserted into the fuel tank and a second opening 16 constructed to communicate with a fill pipe 18 through which fuel is introduced into the tank 10. The fuel system may be a return-type or returnless system or a hybrid of these two which reduces the fuel returned by varying the pump speed to a certain level somewhat greater than the engine fuel demand. As shown in FIGS. 2–4, a plurality of fuel system components are all disposed within the vehicle fuel tank 10 to significantly reduce the number of connections between the exterior of the fuel tank 10 and the interior of the fuel tank to reduce the number of openings through the fuel tank and to greatly facilitate the integration of the fuel tank 10 and fuel system 12 into a vehicle. These components disposed within the tank 10 may include a fuel pump 20, fuel pump module or reservoir 22, fuel vapor canister 24, electronic fuel level sensor 26, electronic tank control module 28, one or more vapor or rollover type valves 30, 32 communicating with the vapor canister 24, and a plurality of sensors including temperature 34, pressure 38 and hydrocarbon vapor or other type sensors 36.

Desirably, the information needed to run the vehicle fuel system 12 and the information from each of the components within the fuel tank 10 can be communicated between the tank control module 28 and electronic control unit (ECU) 40 (FIG. 1) of the vehicle engine 42 through a limited number of wires to greatly reduce the connections between the fuel system 12 and the ECU 40. Notably, only four or five wires which pass through a single electrical connector 44 extending from the fuel tank 10 may be needed to interconnect the ECU 40 and the tank control module 28.

Figure 9:
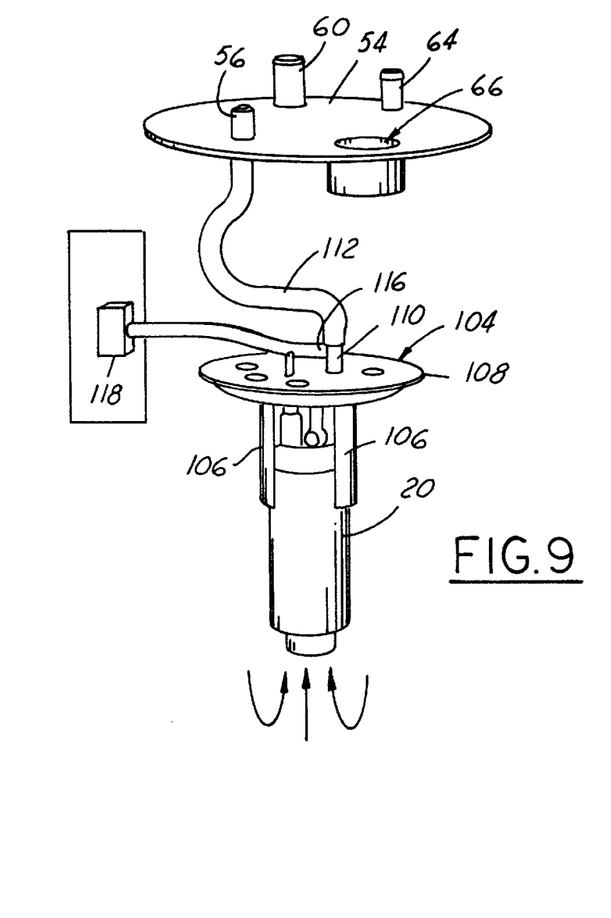
FIG. 9 is a diagrammatic view of a fuel delivery circuit of the fuel system.

The fuel tank 10 preferably has an upstanding annular rim 46 surrounding the first opening 14 with external threads 48 to receive a screw-on cap 50 with a sealing member 52 disposed between the tank 10 and cap 50 to at least reduce and ideally to prevent the escape to the atmosphere of hazardous hydrocarbon fuel vapors through the first opening 14. The cap 50 preferably has a cover 54 which spans the first opening 14 and which may be integrally or separately formed form the cap 50. The cover 54 preferably has a limited number of openings therethrough to communicate the components within the tank 10 with the exterior of the tank 10. For example, the cover 54 may have a fuel outlet opening 56 through which fuel discharged from the fuel pump 20 is delivered through a fuel line 58 to a fuel rail 59 of the engine 42, a vapor outlet 60 which communicates the fuel vapor canister 24 with an intake manifold of the engine 42 through a suitable conduit 62 during a purge cycle of the vapor canister, and an opening 64 through which "cleaned" air from the vapor canister 24 is discharged. The opening 64 may also act as a vent or air inlet during, for example, filling of the tank with fuel, and may receive fresh air into the tank. Any air received into or discharged out of the fuel tank travels through the fuel vapor canister. The electrical connector 44 extends through another opening 66 is (FIG. 9) through the cover 54 to interconnect the electrical wires of the tank control module 28 with the corresponding wires connected to the ECU 40.

Figure 6:
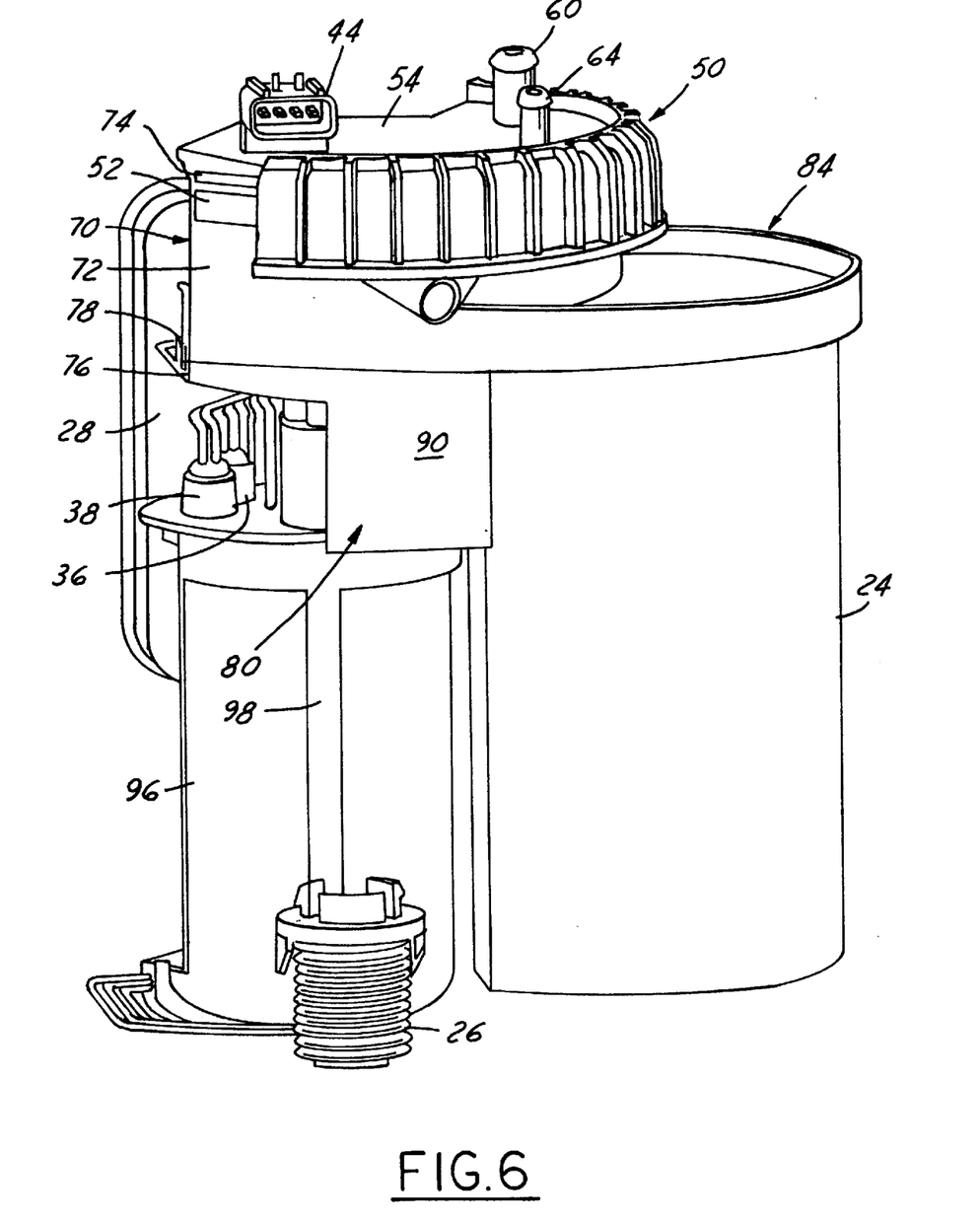
FIG. 6 is a sectional side view of a fuel pump and vapor canister module of FIG. 2.
Figure 7:
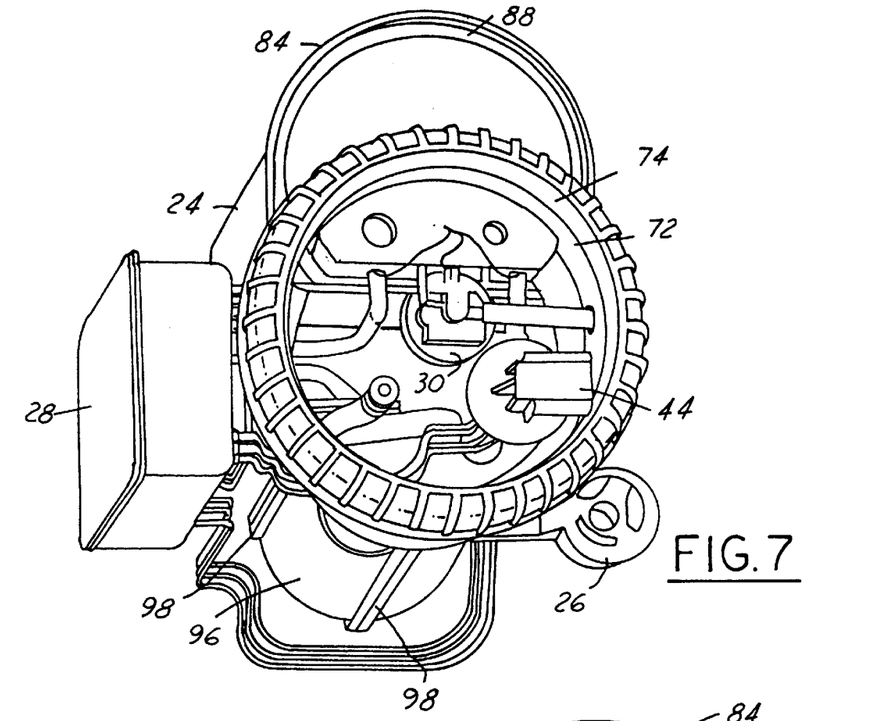
FIG. 7 is a top perspective view of the fuel pump and vapor canister module and electronic control module of the fuel system.
Figure 8:
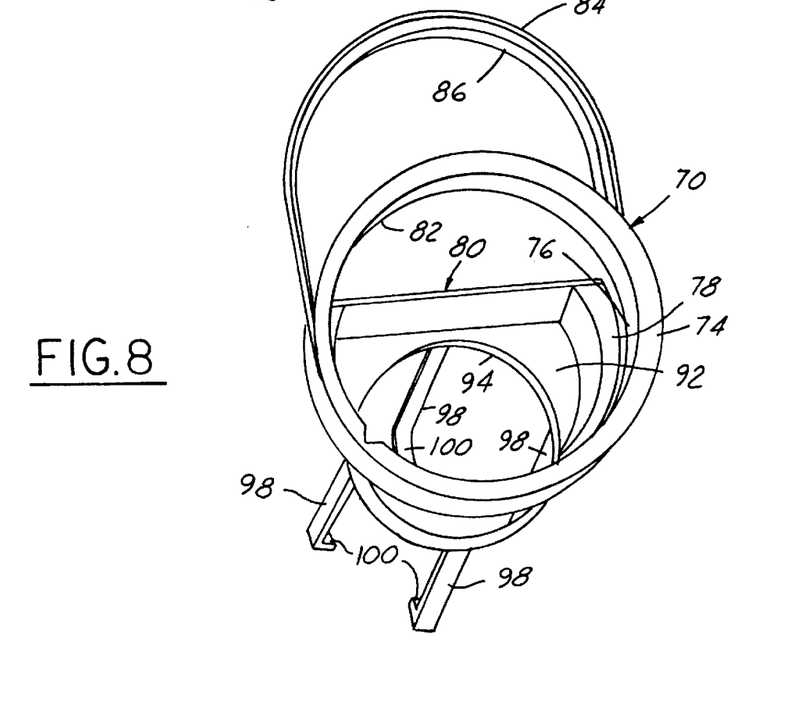
FIG. 8 is a top perspective view of a retainer system of the fuel pump and vapor canister module.
Figure 13:
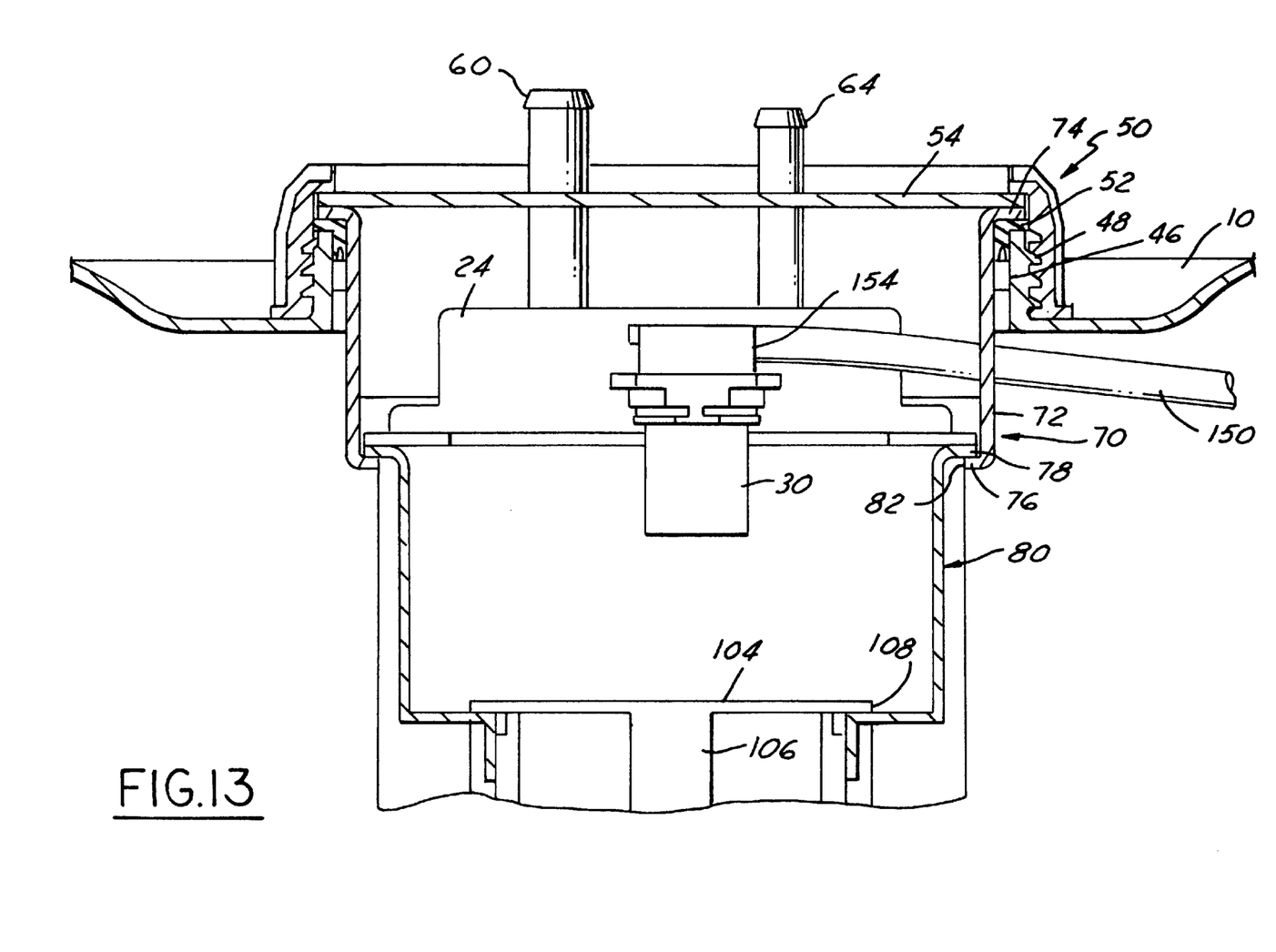
FIG. 13 is an enlarged, fragmentary sectional view illustrating the interconnection of various retainers and other components of the fuel system.

As best shown in FIGS. 2 and 6–8, a first retainer 70 has a generally cylindrical side wall 72 with an upper flange 74 extending generally radially outwardly therefrom and constructed to be sandwiched between the cover 54 and sealing member 52 when the cap 50 is tightened on the fuel tank 10 to seal the first opening 14. As best shown in FIG. 13, the lower edge of the side wall 72 has a radially inwardly extending flange 76 constructed to engage a radially outwardly extending flange 78 of a second retainer 80 to locate the second retainer 80 which is slidably received within a central opening 82 of the first retainer 70. As shown in FIGS. 6–8, a supporting member 84 extends outwardly from the first retainer 70 and has an inwardly extending flange 86 constructed to underlie and support a radially outwardly extending flange 88 of the fuel vapor canister 24 to locate and retain the fuel vapor canister 24.

The second retainer 80 has a skirt 90 depending from its radially outwardly extending flange 78 providing a recess in which a plurality of fuel system components may be received. The skirt 90 extends to an intermediate wall 92 which has a throughbore 94 constructed to receive the fuel pump 20 and module 22 comprising at least an annular, elongate fuel filter 96 surrounding the fuel pump 20. A plurality of arms 98 extend from the second retainer 80 with each arm 98 having a radially inwardly extending finger 100 which in cooperation with the arms 98 support, locate and retain the fuel filter 96. As shown, the fingers 100 may rest on the bottom wall 102 of the fuel tank 10 and sensors adjacent the bottom wall of the fuel tank, such as a piezoelectric fuel level sensor 26 may be connected to an arm 98 to properly orient the sensor 26 on the bottom wall 102 of the fuel tank 10.

The fuel pump 20 is driven by an electric motor and may be of substantially any type including a positive displacement fuel pump, such as disclosed in U.S. Pat. No. 5,219,277 the disclosure of which is incorporated herein by reference in its entirety, or a turbine type fuel pump, such as disclosed in U.S. Pat. No. 5,257,916, the disclosure of which is incorporated herein by reference in its entirety. The fuel pump 20 may be operated at a constant speed, and hence have a constant output fuel flow rate or may be a variable speed type pump to vary the fuel flow rate from the pump as required for various vehicle operating conditions determined by the ECU 40 and the tank control module 28. Electrical wires 120 (FIG. 3) extending through a housing 104 connect the tank control module 28 to the fuel pump 20 to control the operation of the fuel pump 20.

The fuel pump is preferably carried by a housing 104 having depending fingers 106 in which the fuel pump 20 is press fit and a radially outwardly extending rim 108 constructed to overlie and engage intermediate wall 92 of the second retainer 80. A nipple 110 extending from the housing 104 communicates the outlet of the fuel pump 20 with one end of an intermediate fuel line 112 which is connected at its other end to a nipple (not shown) extending through the fuel outlet opening 56 of the cover 54. A passage 116 teed to nipple 110 communicates the outlet of the fuel pump 20 with a pressure transducer 118 disposed within the tank control module 28 or elsewhere within the fuel tank 10 and constructed to provide a signal corresponding to fuel pump outlet pressure to the tank control module 28 and/or ECU 40. A plurality of sensors, such as a temperature sensor 34, a pressure sensor 38, a hydrocarbon sensor 36 and any additional sensors may be mounted on the housing 104 and connected to the tank control module 28 by suitable electrical wires 122, 124, 126 fixed to pins 128 extending from the tank control module 28.

The fuel filter 96 is preferably generally cylindrical and has an upper end fixed to the housing and may have a supporting frame with a base 130 (shown in FIG.2), received on the fingers 100 to support the filter 96 and hold it in place in use. The fuel filter may be received in a housing 129 (FIG. 3) or shell of the fuel pump module 22. The filter preferably has a bottom wall integral with its side wall or a filter carried by the base fixed to the side wall to ensure that any fuel which is drawn through the fuel pump is filtered before entering the fuel pump. The filter preferably has an average pore size of between 5 and 80 microns and preferably about 10 microns to provide a final filtering of the fuel before delivery to the engine. Further, the large surface area of the filter 96 extends the life of the filter and prevents it from becoming clogged or excessively dirty in use during the life of the vehicle fuel system. Still further, the filter 96 or module carrying the filter preferably traps liquid fuel to ensure a liquid fuel supply at the fuel pump inlet even during low fuel level conditions in the fuel tank 10.

The fuel vapor canister 24 has an upper end 140 with an outwardly extending flange 88 constructed to overlie and be received on the inwardly extending flange 86 of the supporting member 84 of the first retainer 70 to locate and retain the vapor canister 24. The vapor canister 24 has one or more inlets 141 through which fuel vapor from various sensors, the fuel pump and the vapor vent valves within the tank is discharged. As diagrammatically shown in FIG. 4, the vapor canister may have a central divider 142 which substantially separates an inlet half 144 of the canister 24 from an outlet half 146 of the canister 24. Fuel vapor which enters the inlet half 144 of the canister flows from the top of the inlet half 144 to the bottom of the inlet half wherein it crosses over to the outlet half 146 of the fuel vapor canister and flows from the bottom of the outlet half to the top of the outlet half 146 and through a vapor outlet 148 which is communicated with the vapor outlet 60 of the cover 54 for delivery to an intake manifold of the engine 42.

A vapor purge valve 134 selectively communicates a vacuum pressure from the engine 42 with the vapor canister 24 through outlet 136 and inlet 137 to "purge" vapor from the canister 24. The valve 134 may be a normally closed solenoid valve actuated and opened in response to a signal from the ECU 40 or control module 28 through wires 138 to begin a vapor purge cycle. When the valve is closed, no fluid flow occurs through vapor outlet 60.

Figure 11:
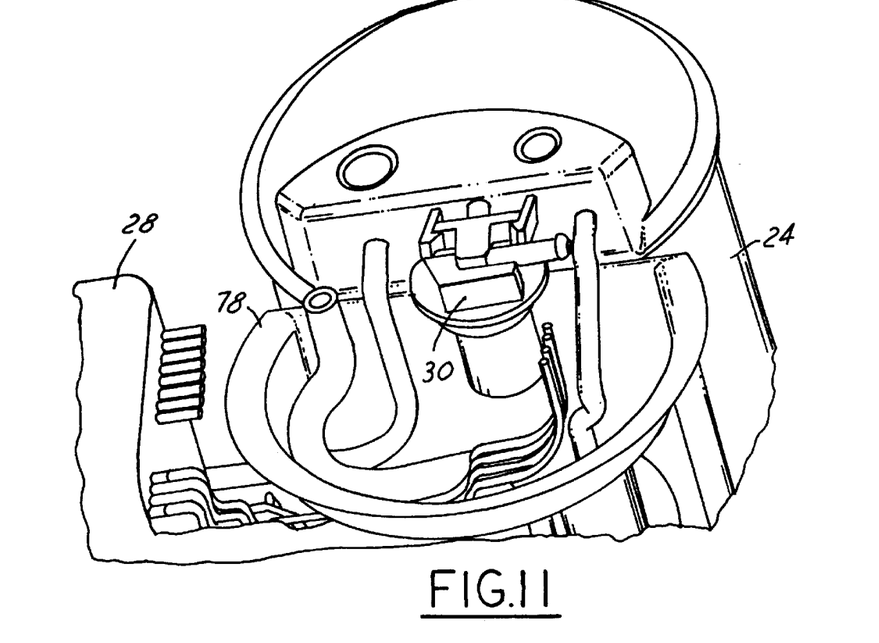
FIG. 11 is an enlarged top view of the fuel pump and vapor canister module illustrating an internal vapor vent valve connected directly to the vapor canister.
Figure 12:
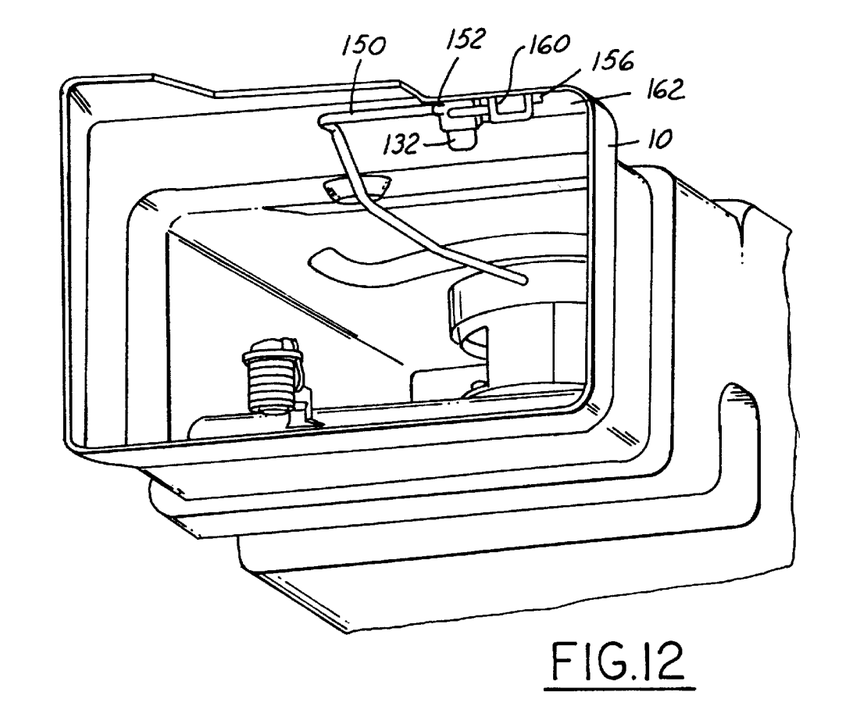
FIG. 12 is a perspective view with parts broken away of the fuel tank illustrating the internal vapor valve of FIG. 4 attached to an upper wall of the fuel tank.

Desirably, a rollover type vapor vent valve 30 may be disposed completely within the fuel tank 10 and is preferably attached to the vapor canister 24 (as shown in FIGS. 7 and 11) to selectively permit fuel vapor within the fuel tank 10 to flow into the vapor canister 24 completely within the fuel tank 10. In the event of a vehicle roll-over condition, the rollover vent valve closes to prevent liquid fuel from entering the vapor canister 24. The rollover type vapor vent valve 30 may be of substantially any construction such as that disclosed in U.S. Pat. No. 5,579,802 the disclosure which is incorporated herein by reference in its entirety. As shown in FIG. 4, a second vapor vent valve 32 may be disposed within the vehicle fuel tank 10 to vent fuel vapor from a second portion of the tank, spaced from valve 30, to the vapor canister 24. The second vent valve 32 may have an outlet connected to a conduit 150 to communicate the second vapor vent valve 32 with an inlet 154 of the rollover vapor vent valve 30 to discharge fuel vapor which flows through the second vent valve 32 into the vapor canister 24 through the rollover vent valve 30. The second vapor vent valve 32 may have an annular retaining ring 156 with generally radially inwardly extending tabs 158 constructed to frictionally engage a generally cylindrical depression 160 in an upper wall 162 of the fuel tank 10 as shown in FIG. 12 to hold the second vapor vent valve 72 adjacent the upper wall 162 of the fuel tank 10. If desired, additional vapor vent valves may be provided within the fuel tank in a similar manner. Notably, the entire vapor collection and storage assembly is disposed completely within the fuel tank with only a vapor outlet 60 and opening 64 extending from the fuel tank to provide an air inlet and to communicate the vapor canister 24 with the air intake manifold 164 of the engine 42.

Figure 10:
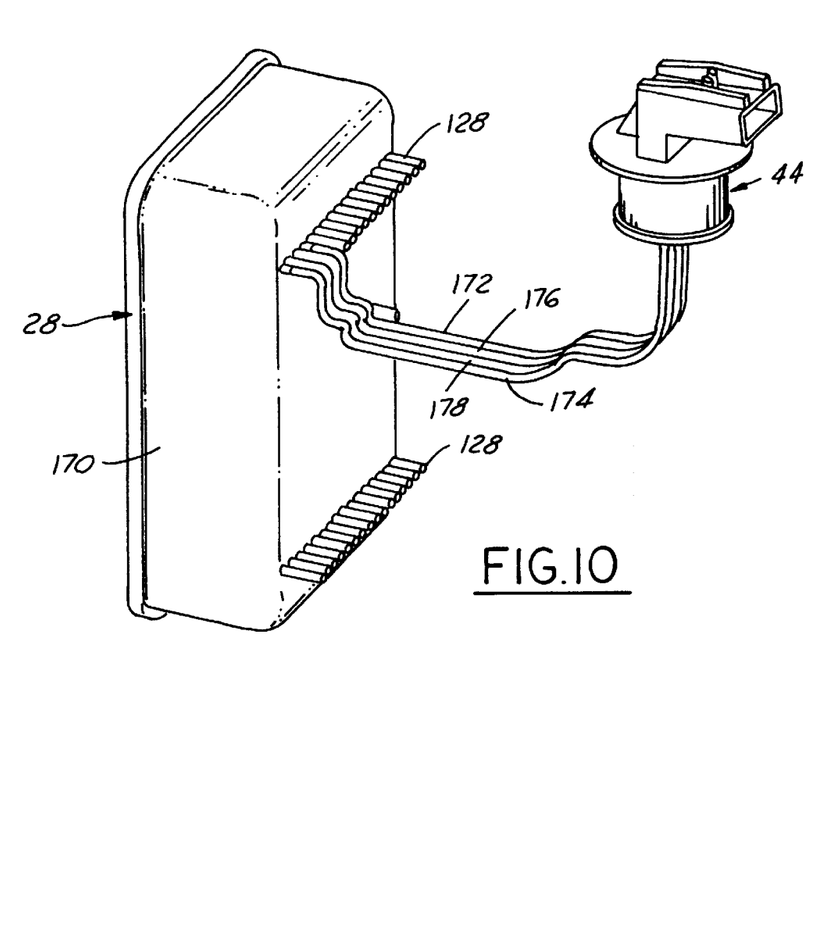
FIG. 10 is a perspective view of the electronic control module and electrical connector which interconnects the electronic control module and the ECU.

The electronic tank control module 28 has a housing 170 in which one or more electrical connectors is received with pins 128 extending through the housing with a seal surrounding each pin 128 to prevent fuel from entering the housing 170. The various pins 128 of the electrical connectors may be constructed to receive information from a sensor or fuel system component or to send information to a fuel system component or to the ECU 40. Desirably, in one embodiment best shown in FIG. 10, only four wires extend from the tank control module 28 to the ECU 40 with two wires 172,178 being a power supply and ground, a third wire 174 being a multiplex bus positive wire, and a fourth wire 176 being a multiplex bus negative wire. In some applications, a second ground wire may be needed for the signal of the multiplex bus wires. The multiplex bus wires 176, 178 may comprise a differential line drive which transmits signals to and from the ECU 40 and electronic tank control module 28 and if desired, to various other vehicle computer controllers such as the dashboard computer, transmission computer and "body" computer (which may be used for anti-lock brakes, active suspension systems, etc.) to name a few, to provide the information necessary for the efficient operation of the vehicle fuel system 12 and the vehicle. The housing 170 of the tank control module 28 may be mounted to an interior wall of the fuel tank 10 or may be carried by or fixed to one of the other components of the fuel system 12 such as the first retainer 70, second retainer 80 or fuel vapor canister 24, for example. Some examples of a currently available vehicle multiplex bus which may be suitable for the tank control module are the J1850 bus and the CAN bus.

Through the multiplex bus of the tank control module 28, the engine ECU 40 may send messages to the tank control module 28 to enable or "power-up" the fuel pump 20, to control the output pressure of the fuel pump if a variable speed fuel pump is provided, to disable the fuel pump in the event of a vehicle accident which may be indicated by the activation of a vehicle passive restraint system, to control the purging of the vapor canister, to indicate the ambient temperature, to indicate the engine temperature, and to request information from one or more sensors such as OBD (On Board Diagnostics) sensors. The tank control module 28 may send messages to the ECU 40 or other vehicle systems which indicate the quantity of fuel in the fuel tank, the fuel pressure delivered from the fuel pump 20, the temperature of the fuel, the fuel quality which may depend on a number of factors including alcohol content and vapor content among other factors. And, the tank control module 28 may transmit signals from OBD sensors used to determine if there are any fuel system component failures which may be indicated by liquid fuel loss or pressure losses in the system (such as in the fuel tank or between the fuel rail and fuel pump) which may result in the discharge of liquid fuel or hydrocarbon vapors from the fuel system. The messages from the tank control module 28 may also be used to determine the vapor canister 24 content and information on the fuel pump 20 such as the hours of use of the fuel pump and problems with the fuel pump, such as excessive current draw, which may be caused by a plugged filter or worn pump or motor. Further, if the vapor content of the fuel vapor canister 24 is detected, the tank control module 28 can send a request to the engine ECU 40 or other control system to initiate a vapor purge cycle for the fuel vapor canister. Thus, tank control module 28 may receive information from and send information to a plurality of vehicle control systems including the engine ECU 40 through a limited number of wires. Through these wires, substantially any fuel system component or fuel system condition can be communicated throughout the vehicle to increase the efficiency while greatly decreasing the number of wires and electrical connectors which must be used which significantly facilitates the assembly of the fuel system into the vehicle.

Thus, the fuel system 12 according to the present invention reduces the number of openings through the vehicle fuel tank 10 to reduce the leak paths through which hazardous hydrocarbon vapors may escape to the atmosphere. The fuel system also incorporates an electronic tank control module 28 into the vehicle fuel tank 10 which communicates with the engine ECU 40 and which may be calibrated for a particular fuel system application to eliminate the need for the ECU 40 to be calibrated for each particular fuel system application and to more efficiently operate the fuel system. The fuel system 12 also eliminates many of the connections which were formally outside of the fuel tank 10 to facilitate the integration of the fuel tank and fuel system into a vehicle during assembly. Numerous fuel system components and numerous sensors may be communicated with the ECU 40 through the tank control module 28 by a limited number of wires extending between the tank control module and ECU and other vehicle control systems.

What is claimed is:

1. A vehicle fuel system, comprising:
    a fuel tank having an opening into an interior of the fuel tank;
    a fuel pump disposed within the interior of the fuel tank which draws fuel from the fuel tank and discharges fuel from the fuel tank through an outlet passage extending through the fuel tank opening and communicating with the exterior of the fuel tank through said opening;
    an electronic control module disposed in the fuel tank and connected with said fuel pump to send signals to or receive signals from said fuel pump and adapted to electronically communicate with a vehicle control system external to the fuel tank;
    a cap releasably sealingly connected to the fuel tank to close the opening and having the fuel outlet passage extending through the cap and an opening through which wires connected to the control module are received; and
    a fuel vapor storage canister disposed in the fuel tank with an inlet to receive fuel vapor from within the fuel tank and an outlet through which vapor or air discharged from the fuel vapor storage canister is discharged from the fuel tank and an outlet through the cap through which the outlet of the fuel vapor storage canister communicates externally of the fuel tank.

2. The fuel system of claim 1 wherein the control module controls the application of electrical power to the fuel pump.

3. The fuel system of claim 1 wherein the control module receives from the fuel pump signals of fuel pump operating characteristics and transmits corresponding signals to a control system external to the fuel tank.

4. The fuel system of claim 1 which also comprises a vapor vent valve disposed in the fuel tank at the inlet of the fuel vapor storage canister to control fluid flow into the inlet of the fuel vapor canister.

5. The fuel system of claim 4 which also comprises a second vapor vent valve disposed in the fuel tank spaced from the fuel vapor storage canister and communicating with the fuel vapor storage canister through the other vapor vent valve.

6. The fuel system of claim 1 which also comprises a fuel level sensor disposed in the fuel tank and communicating with the control module to provide an indication of the level of fuel in the fuel tank to a control unit external to the fuel tank.

7. The fuel system of claim 1 which also comprises a retainer assembly disposed in the fuel tank and constructed to locate the fuel pump and fuel vapor storage canister with the fuel tank.

8. The fuel system of claim 7 wherein the retainer assembly has a first retainer releasably connected to the fuel tank to locate the first retainer and having a flange and a second retainer having a flange adapted to engage the flange of the first retainer in assembly to locate the second retainer relative to the first retainer.

9. The fuel system of claim 8 wherein the first retainer also has a supporting member extending therefrom with a flange adapted to locate and retain the fuel vapor storage canister relative to the first retainer.

10. The fuel system of claim 8 which also comprises a housing retained by the second retainer and having depending fingers between which the fuel pump is received to retain and locate the fuel pump.

11. The fuel system of claim 1 wherein the cap has a threaded portion adapted to screw-on to a complementary threaded portion of the fuel tank, a cover spanning the fuel tank opening, and a sealing member between the cap and fuel tank.

12. The fuel system of claim 1 which also comprises a temperature sensor disposed in the fuel tank and communicating with the control module.

13. The fuel system of claim 1 which also comprises a hydrocarbon sensor disposed in the fuel tank and communicating with the control module.

14. The fuel system of claim 1 which also comprises a pressure sensor disposed in the fuel tank in communication with the fuel pump outlet and the control module to provide an indication of fuel pump output pressure to the control module.

15. The fuel system of claim 1 wherein the control module is communicated by multiplex bus positive and negative wires with a control system external to the fuel tank.

16. The fuel system of claim 15 wherein said control system external to the fuel tank is a vehicle engine control unit.

17. The fuel system of claim 1 which also comprises a vapor purge valve disposed in the fuel tank and in communication with the fuel vapor storage canister to control purging of the fuel vapor storage canister.

18. The fuel system of claim 17 wherein the vapor purge valve is electrically connected to the control module to control operation of the vapor purge valve.

19. A vehicle fuel system comprising:

a fuel tank having an interior, an exterior and an opening communicating the interior with the exterior of the tank;

a cover connected to the fuel tank to close and seal the opening;

a fuel pump disposed through the opening within the tank, driven by an electric motor, and which draws fuel from the interior of the fuel tank and discharges fuel from the fuel tank through an outlet passage extending through only the cover to the exterior of the fuel tank;

a fuel vapor storage canister disposed in the fuel tank and having an inlet to receive fuel vapor and air from the interior of the fuel tank and an outlet passage extending through only the cover to the exterior of the fuel tank for discharging fuel vapor or air from the fuel vapor storage canister externally of the fuel tank; and the electric motor of the fuel pump is electrically connected externally of the fuel tank through electrical connectors which extend through only the cover to the exterior of the fuel tank.

20. The fuel system of claim 19 wherein the fuel vapor storage canister also has an air passage which communicates with the exterior of the tank through only the cover.

21. The fuel system of claim 19 which also comprises an electronic control module disposed in the interior of the fuel tank to electronically communicate with a vehicle control system external of the fuel tank through an electrical connector extending through only the cover to the exterior of the fuel tank.

22. The fuel system of claim 21 which also comprises at least one of a temperature sensor, a hydrocarbon sensor and a pressure sensor disposed in the interior of the fuel tank and electrically communicating within the interior of the tank with the control module.

23. The fuel system of claim 19 which also comprises a purge valve disposed within the interior of the fuel tank in communication with the fuel vapor storage canister to control purging of fuel vapor or air from the canister to the exterior of the fuel tank and the purge valve is electrically connected within the interior of the fuel tank to the control module to control operation of the purge valve.

* * * * *